US009267481B2

(12) United States Patent
Takamura et al.

(10) Patent No.: US 9,267,481 B2
(45) Date of Patent: Feb. 23, 2016

(54) HYBRID VEHICLE ENGINE START CONTROL SYSTEM

(75) Inventors: Yutaka Takamura, Yokohama (JP); Yoshinori Yamamura, Yokohama (JP); Hiroyuki Ashizawa, Yokohama (JP); Jun Amemiya, Atsugi (JP)

(73) Assignee: Nissan Motor Co., Ltd., Yokohama (JP)

( * ) Notice: Subject to any disclaimer, the term of this patent is extended or adjusted under 35 U.S.C. 154(b) by 252 days.

(21) Appl. No.: 13/879,772

(22) PCT Filed: Oct. 3, 2011

(86) PCT No.: PCT/JP2011/072728
§ 371 (c)(1),
(2), (4) Date: Jun. 11, 2013

(87) PCT Pub. No.: WO2012/053340
PCT Pub. Date: Apr. 26, 2012

(65) Prior Publication Data
US 2013/0297128 A1 Nov. 7, 2013

(30) Foreign Application Priority Data

Oct. 21, 2010 (JP) .................................. 2010-236519

(51) Int. Cl.
*F02N 11/08* (2006.01)
*B60K 6/48* (2007.10)
(Continued)

(52) U.S. Cl.
CPC .............. *F02N 11/0814* (2013.01); *B60K 6/48* (2013.01); *B60L 11/14* (2013.01); *B60W 10/02* (2013.01);
(Continued)

(58) Field of Classification Search
None
See application file for complete search history.

(56) References Cited

U.S. PATENT DOCUMENTS 6,688,411 B2 * 2/2004 Boggs et al. ............. 180/65.235
2003/0089538 A1 * 5/2003 Boggs et al. ................. 180/65.2
(Continued)

FOREIGN PATENT DOCUMENTS

CN 1993258 A 7/2007
JP 11-82261 A 3/1999
(Continued)

OTHER PUBLICATIONS

An English translation of the Japanese Office Action for the corresponding Japanese patent application No. 2012-539659 issued on Feb. 18, 2014.
(Continued)

*Primary Examiner* — Fadey Jabr
*Assistant Examiner* — Kevin P Mahne
(74) *Attorney, Agent, or Firm* — Global IP Counselors, LLP

(57) ABSTRACT

When there is a requirement on switching from the electrically driven drive mode to the hybrid drive mode by changing an accelerator position opening, the torque capacity is generated for the first clutch to start the engine. However, as torque capacity is at $\beta1$, the engine rotational speed is quickly increased to the high-speed region free of the influence of the compressive reactive force of the engine; once the engine rotational speed becomes the high-speed region, the engine rotational speed is decreased as torque capacity and is at $\beta2$. Consequently, it is possible to quickly pass through the low engine rotational speed region as the engine rotational speed torque is increased under the influence of the compressive reactive force, and avoiding the poor acceleration, as can be seen from the smooth variation of the time sequence increase of the transmission output rotational speed as indicated by $\beta3$, is possible.

15 Claims, 14 Drawing Sheets

(51) Int. Cl.
  *B60W 10/06* (2006.01)
  *B60W 10/08* (2006.01)
  *B60W 20/00* (2006.01)
  *B60L 11/14* (2006.01)
  *B60W 10/02* (2006.01)
  *B60W 30/192* (2012.01)

(52) U.S. Cl.
  CPC .............. *B60W 10/06* (2013.01); *B60W 10/08* (2013.01); *B60W 20/00* (2013.01); *B60W 20/40* (2013.01); *B60W 30/192* (2013.01); *B60K 2006/4825* (2013.01); *B60L 2210/30* (2013.01); *B60L 2210/40* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2240/507* (2013.01); *B60L 2270/145* (2013.01); *B60W 2710/027* (2013.01); *Y02T 10/48* (2013.01); *Y02T 10/6221* (2013.01); *Y02T 10/6252* (2013.01); *Y02T 10/6286* (2013.01); *Y02T 10/642* (2013.01); *Y02T 10/70* (2013.01); *Y02T 10/7077* (2013.01); *Y02T 10/7241* (2013.01); *Y10S 903/902* (2013.01)

(56) References Cited

U.S. PATENT DOCUMENTS

| | | | |
|---|---|---|---|
| 2005/0121239 A1* | 6/2005 | Tsuneyoshi et al. | 180/65.2 |
| 2005/0252474 A1* | 11/2005 | Sah et al. | 123/179.3 |
| 2006/0048734 A1* | 3/2006 | Kataoka et al. | 123/179.4 |
| 2006/0089232 A1* | 4/2006 | Kobayashi et al. | 477/70 |
| 2007/0056783 A1 | 3/2007 | Joe et al. | |
| 2007/0102207 A1* | 5/2007 | Yamanaka et al. | 180/65.3 |
| 2007/0227791 A1* | 10/2007 | Ueno | 180/65.2 |
| 2007/0275818 A1* | 11/2007 | Kouno | 477/3 |
| 2009/0140521 A1* | 6/2009 | Bryan et al. | 290/31 |
| 2009/0143950 A1* | 6/2009 | Hasegawa et al. | 701/68 |
| 2009/0308674 A1* | 12/2009 | Bhattarai et al. | 180/65.265 |
| 2010/0056328 A1* | 3/2010 | Schenk et al. | 477/8 |
| 2010/0059007 A1* | 3/2010 | Senda et al. | 123/179.4 |
| 2010/0197449 A1* | 8/2010 | Imamura et al. | 477/3 |
| 2010/0292047 A1* | 11/2010 | Saito | 477/5 |
| 2012/0116629 A1* | 5/2012 | Kamoshida | 701/22 |
| 2013/0297128 A1 | 11/2013 | Takamura et al. | |
| 2013/0297131 A1* | 11/2013 | Yaguchi et al. | 701/22 |

FOREIGN PATENT DOCUMENTS

| | | |
|---|---|---|
| JP | 2006-306209 A | 11/2006 |
| JP | 2007-126082 A | 5/2007 |
| JP | 2009-208562 A | 9/2009 |
| JP | 2009-208563 A | 9/2009 |
| WO | 2012053340 A1 | 4/2012 |

OTHER PUBLICATIONS

An English translation of the Japanese Office Action for the corresponding Japanese patent application No. 2012-539659 issued on Jul. 8, 2014.

An English Translation of Japanese Office Action for the corresponding Japanese patent application No. 2012-539659 issued on Nov. 25, 2014.

The Chinese Office Action for the corresponding Chinese Application No. 201180062225.4 issued on Feb. 12, 2015.

* cited by examiner

HYBRID VEHICLE ENGINE START CONTROL SYSTEM

CROSS-REFERENCE TO RELATED APPLICATIONS

This application is a U.S. National stage of International Application No. PCT/JP2011/072728, filed Oct. 3, 2011. This application claims priority to Japanese Patent Application No. 2010-236519, filed with Japan Patent Office on Oct. 21, 2010.

BACKGROUND

1. Field of the Invention

The present invention relates to a hybrid vehicle that can be run by the power from an electrically driven motor in addition to an engine and that has an electrical drive (EV) mode in which the hybrid vehicle runs only off of the power from the electrically driven motor, and a hybrid drive (HEV) mode, in which the hybrid vehicle runs off of the power from both the engine and the electrically driven motor. More specifically, the present invention relates to an engine start control system of the hybrid vehicle, wherein the mode switch from the EV mode to the HEV mode together with the starting of the engine is carried out in a state in which the mode switch has a minimum influence on the compressive reactive force when the engine is started.

2. Background Information

The hybrid vehicle described above is well known and is described in, for example, Japanese Laid Open Patent Application No. 2007-126082. For this hybrid vehicle, a first clutch that allows for a change in the torque transfer capacity is included between the engine and the electrically driven motor, and a second clutch that allows for a change in the torque transfer capacity is included between the electrically driven motor and the drive wheels. For this hybrid vehicle, it is possible to select the electrically driven drive (EV) mode by shutting down the engine to release the first clutch and, at the same time, to engage the second clutch, so that only the power from the electrically driven motor is in use; additionally, it is possible to select the hybrid drive (HEV) mode by engaging both the first clutch and the second clutch, so that the power from the engine and the electrically driven motor is used for driving the vehicle.

For the hybrid vehicle described above, switching the mode between the former EV mode and the latter HEV mode is necessary. In addition, for the mode switching, carrying out the engine start control via the torque capacity control of the first clutch and the second clutch is necessary. As far as the mode switch control is concerned, the Patent Document 1 proposed the following engine start control technology when the engine start control is carried out by making progress in the engagement of the first clutch when the mode switch is carried out from the EV mode to the HEV mode.

That is, when progress is being made in the engagement of the first clutch when the engine start described above is carried out, the torque capacity of the first clutch is the sum of the torque for increasing the engine rotational speed and the torque corresponding to the engine friction portion; as cranking is carried out by such torque, when the engine makes a complete ignition and is started, and the before/after differential rotational speed of the first clutch becomes 0, the torque capacity of the first clutch is at the maximum value, and the engagement is made completely.

SUMMARY

For the conventional engine start control of the hybrid vehicle described above, there is the following problem. That is, for the engine, a compressive reactive force takes place in the compression stroke in cranking, and, under the influence of such compressive reactive force, the engine rotational speed increasing torque needed for increasing the engine rotational speed becomes higher. For the increase in the engine rotational speed under the influence of such a compressive reactive force, if the engine rotational speed is higher, the rotating inertia is higher, so that the compressive reactive force can almost be ignored. However, as the engine rotational speed is lower, the rotating inertia becomes smaller, and the compressive reactive force can no longer be ignored.

In the low engine rotational speed region where an increase in the engine rotational speed increasing torque becomes larger under the influence of such a compressive reactive force, in order to cope with the portion of increase in the engine rotational speed increasing torque, the torque capacity of the first clutch is increased. Corresponding to such an increase portion, the electrically driven motor torque that can be distributed via the second clutch to the drive wheel side becomes smaller. For example, starting the engine with the mode switch from the EV→HEV mode corresponding to stepping down on the accelerator pedal causes a decrease in the drive torque, so that poor acceleration takes place, and this is undesirable.

In order to solve this problem, people have proposed a scheme in which the torque capacity of the first clutch is decreased. However, in such cases, due to an insufficiency of the cranking torque, the engine start time becomes longer, and variation in the engine start time leads to an unstable acceleration feeling. This is undesirable.

The purpose of the present invention is to provide an engine start control system of the hybrid vehicle as an embodiment, based on the viewpoint that the problem described above can be avoided, which is the engine rotational speed when the engine is started and is increased to a high engine rotational speed region when the increase in the engine rotational speed increasing torque caused by the influence of the compressive reactive force can be ignored.

In order to realize the purpose described above, the engine start control system of the hybrid vehicle of the present invention has the following configuration. First, the hybrid vehicle should be explained as a precondition. The hybrid vehicle has an engine and an electrically driven motor as the power sources; a first clutch that allows for the change in the torque transfer capacity is included between the engine and the electrically driven motor, and a second clutch that allows for the change in the torque transfer capacity is included between the electrically driven motor and the drive wheels; for this hybrid vehicle, it is possible to select the electrically driven running mode by shutting down the engine to release the first clutch and, at the same time, to engage the second clutch, so that only the power from the electrically driven motor is in use, and selecting the hybrid running mode is possible by engaging both the first clutch and the second clutch, so that the power from the engine and the electrically driven motor are used for driving the vehicle.

In the engine start control system of the present invention, the following engine starting first clutch engagement control means is arranged for such a hybrid vehicle. The engine starting first clutch engagement control means works as follows: when the mode switch is carried out from the electrically driven running mode described above to the hybrid running mode, as the engine is started due to the progress of the engagement of the first clutch, the torque capacity of the first clutch is increased so that the engine rotational speed is increased within a prescribed time to the high-speed region wherein the increase in the engine rotational speed increasing torque caused by the compressive reactive force of the engine can be ignored, and, at the time when the engine rotational speed reaches a prescribed rotational speed, the torque capacity of the first clutch is decreased.

According to the engine start control system of the hybrid vehicle in the present invention, when the engine starts due to progress in the engagement of the first clutch as the mode switching is carried out from the electrically driven running mode to the hybrid running mode, the torque capacity of the first clutch is increased so that the engine rotational speed is increased within a prescribed time to a high-speed region wherein the increase in the engine rotational speed increasing torque caused by the compressive reactive force of the engine can be ignored, and then, when the engine rotational speed reaches a prescribed rotational speed, the torque capacity of the first clutch is decreased; as a result, when the engine starts, the rotational speed can be quickly increased and can reach the high speed region at which point the influence of the compressive reactive force of the engine can be ignored.

Consequently, it is possible to quickly pass through the low engine rotational speed region where the engine rotational speed increasing torque becomes particularly noticeable due the influence of the compressive reactive force of the engine, and there is no need to increase the torque capacity of the first clutch for coping with the increase in the engine rotational speed increasing torque. Consequently, there is no decrease in the electrically driven motor torque that can be distributed to the drive wheel side via the second clutch, and it is possible to avoid the problem of the poor acceleration caused by the decrease in the drive torque when the engine starts during the switch from the electrically driven running mode to the hybrid running mode.

In addition, with the increase in the torque capacity of the first clutch as the engine is started, the engine rotational speed can be quickly increased to the high-speed region free from the influence of the compressive reactive force described above. As a result, it is possible to avoid the problem of increasing the engine start time due to the insufficient cranking torque and the unstable acceleration feeling caused by the variation in the engine start time.

DETAILED DESCRIPTION OF EMBODIMENTS

In the following, embodiments of the present invention will be explained with reference to the annexed figures.

Embodiment 1

Figure 1:
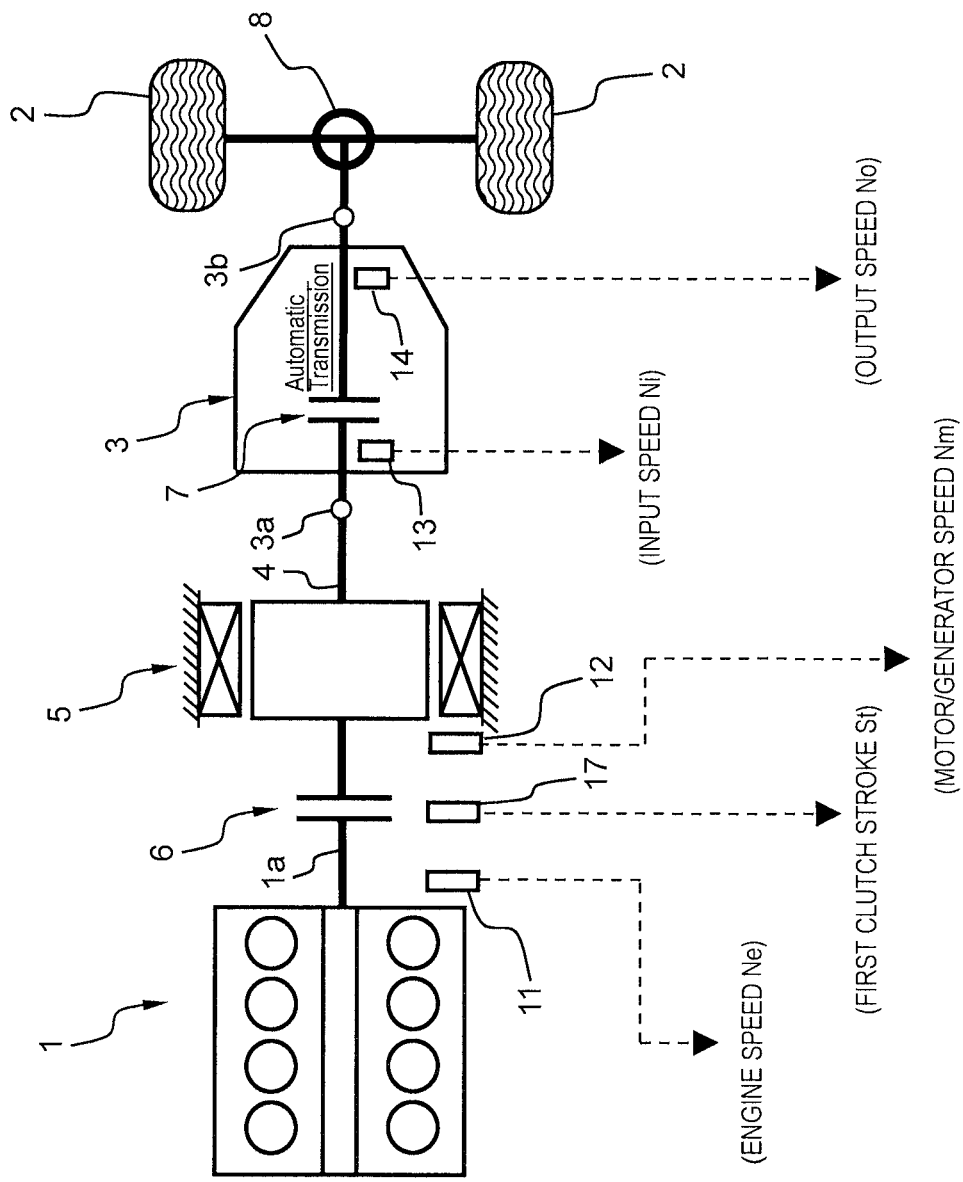
FIG. 1 is a schematic plane view illustrating an example of the power train of the hybrid vehicle wherein the engine start control system of the present invention can be adopted.

FIG. 1 is a diagram illustrating an example of the power train of the hybrid vehicle wherein the engine start control system of the present invention can be adopted. This hybrid vehicle has a front engine/rear-wheel drive vehicle (rear-wheel drive vehicle) as the base vehicle, which is then converted to the hybrid vehicle. Here, key 1 represents an engine as the first power source, and key 2 represents drive wheels (the rear wheels).

In the power train of the hybrid vehicle shown in FIG. 1, just as in a conventional rear wheel driving vehicle, an automatic transmission 3 is arranged in tandem behind the engine 1 in the longitudinal direction of the vehicle. There is a motor/generator 5 coupled to the shaft 4 that transmits the rotation from the engine 1 (the crankshaft 1a) to the input shaft 3a of the automatic transmission 3. In the hybrid vehicle shown in FIG. 1, the motor/generator 5 is used as the second power source.

The motor/generator 5 may work either as an electrically driven motor (a motor) or a generator (an electric power generator), and the motor/generator is configured and arranged between the engine 1 and the automatic transmission 3. More specifically, the first clutch 6 is included between the motor/generator 5 and the engine 1 or, more specifically, between the shaft 4 and the engine crankshaft 1a. This first clutch 6 works so that the engine 1 and the motor/generator 5 can be engaged with each other or disengaged from each other.

The first clutch 6 can make continuous or stepwise changes in the torque transfer capacity. For example, the first clutch is a wet-type, multi-plate clutch that continuously or stepwise controls the clutch hydraulic fluid flow rate and the clutch hydraulic pressure by a proportional solenoid so that the torque transfer capacity can be changed.

The second clutch 7 is included between the motor/generator 5 and the drive wheels (the rear wheels) 2. By means of the second clutch 7, the motor/generator 5 and the drive wheels (the rear wheels) 2 can be either engaged with each other or disengaged from each other. Just as the first clutch 6, the second clutch 7 also can continuously or stepwise change the torque transfer capacity, and the second clutch may also be a wet-type, multi-plate clutch that continuously or stepwise controls the clutch hydraulic fluid flow rate and the clutch hydraulic pressure by a proportional solenoid so that the torque transfer capacity can be changed.

The automatic transmission 3 may be of any well known types. By selectively engaging or disengaging the plural gear shift frictional elements (the clutches or brakes, etc.), the transmission system chain (the transmission step) is determined by the combination of the engagement/disengagement of these gear shift frictional elements. Consequently, the automatic transmission 3 makes changes for the rotational speed from the input shaft 3a to the output shaft 3b with the gear ratio corresponding to the selected gear shift step. The output rotation is distributed and transmitted by the differential gear unit 8 to the left/right rear wheels 2 for driving the vehicle. Of course, the automatic transmission 3 is not limited to the step type described above, as the automatic transmission may also be stepless transmission.

However, as shown in FIG. 1, instead of a dedicated clutch newly arranged, the second clutch 7 that can engage/disengage the motor/generator 5, and the drive wheels 2 may be made of the existing gear shift frictional element in the automatic transmission 3. In this case, as the second clutch 7 is engaged, the aforementioned gear shift step selection function (the gear shift function) is displayed, and the automatic transmission 3 is set in the power transmitting state. In addition, by both the disengagement and the engagement of the first clutch 6, the mode selecting function to be explained later can be displayed; as there is no need to have a dedicated second clutch, the cost can be significantly reduced.

However, the second clutch 7 may also be a dedicated clutch newly arranged. In this case, the second clutch 7 may be configured and arranged between the input shaft 3a of the automatic transmission 3 and the motor/generator shaft 4, or the second clutch may be configured and arranged between the output shaft 3b of the automatic transmission 3 and the rear wheel driving system.

For the power train of the hybrid vehicle shown in FIG. 1 described above, when the electrically driven drive (EV) mode is required as adopted in the low load/low vehicle speed, including the case of starting from the stopped state, the first clutch 6 is disengaged and as the second clutch 7 is engaged, the automatic transmission 3 is in the power transmitting state. In addition, among the gear shift frictional elements in the automatic transmission 3, the second clutch 7 is of the gear shift frictional element that should be engaged in the current gear shift step, and the second clutch varies corresponding to each gear shift step being selected.

When the motor/generator 5 is turned on in this state, only the output rotation from the motor/generator 5 reaches the input shaft 3a of the transmission, the automatic transmission 3 makes the gear shift for the rotation to the input shaft 3a corresponding to the selected gear shift step, and the gear shifted rotation is output from the output shaft 3b of the transmission. The rotation from the output shaft 3b of the transmission is then transmitted via the differential gear unit 8 to the rear wheels 2, and the vehicle can run in the electrically driven drive (EV) mode using only the motor/generator 5.

When the hybrid drive (HEV) mode is required, as is adopted in high-speed driving or high-load driving states, etc., while the automatic transmission 3 is in the corresponding gear shift step selection state (the power transmitting state), as it is due to the engagement of the second clutch 7, the first clutch 6 is also engaged. In this state, both the output rotation from the engine 1 and the output rotation from the motor/generator 5 reach the input shaft 3a of the transmission, the rotation to the input shaft 3a is gear shifted by the automatic transmission 3 corresponding to the selected gear shift step, and the rotation is output from the output shaft 3b of the transmission. Then, the rotation from the output shaft 3b of the transmission goes via the differential gear unit 8 to the rear wheels 2, and the vehicle can run in the hybrid drive (HEV) mode using both the engine 1 and the motor/generator 5.

When the engine 1 runs with optimum mileage and the energy becomes excessive while driving in the HEV mode, as the motor/generator 5 works as a generator due to the excessive energy, the excessive energy is converted to electric power, the generated electric power is accumulated for driving the motor of the motor/generator 5, and it is possible to improve the mileage of the engine 1.

Figure 2:
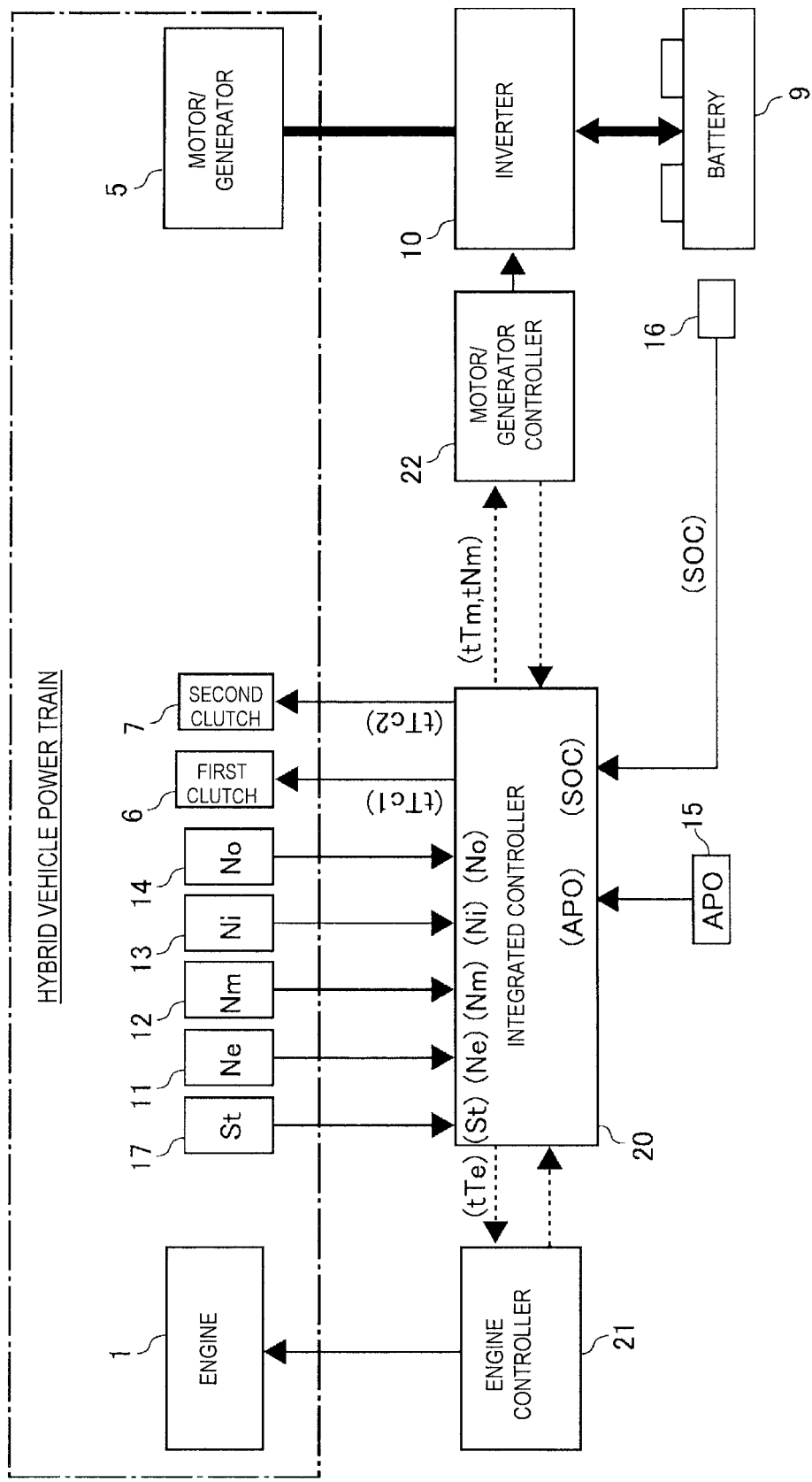
FIG. 2 is a block diagram illustrating the control system of the power train shown in FIG. 1.

The engine 1, the motor/generator 5, the first clutch 6, and the second clutch 7 that form the power train of the hybrid vehicle shown in FIG. 1 are controlled by the system as shown in FIG. 2. The control system shown in FIG. 2 has an integrated controller 20 that carries out the integrated control for the operation point of the power train, and the operation point of the power train is defined by the target engine torque tTe, the target motor/generator torque tTm, the target motor/generator rotational speed tNm, the target torque transfer capacity tTc1 of the first clutch 6, and the target torque transfer capacity tTc2 of the second clutch 7.

For the integrated controller 20, in order to determine the operation point of the power train described above, the following signals are input respectively: the signal from the engine speed sensor 11 that detects the engine rotational speed Ne, the signal from the motor/generator rotational speed sensor 12 that detects the motor/generator rotational speed Nm, the signal from the input rotational speed sensor 13 that detects the transmission input rotational speed Ni, the signal from the output rotational speed sensor 14 that detects the transmission output rotational speed No, the signal from the accelerator pedal position sensor 15 that detects the accelerator pedal compression quantity (the accelerator position opening APO) that represents the required load on the vehicle, the signal from the electrical storage state of charge sensor 16 that detects the electrical storage state of charge SOC (the electric power that can be output) of the battery 9 that stores the electric power for the motor/generator 5, and the signal from the clutch stroke sensor 17 that detects the stroke St of the first clutch 6.

Among the sensors described above, the engine speed sensor 11, the motor/generator rotational speed sensor 12, the input rotational speed sensor 13, the output rotational speed sensor 14 and the clutch stroke sensor 17 can be arranged, respectively, as shown in FIG. 1.

Among the aforementioned input information from the accelerator position opening APO, the battery electrical storage state of charge SOC and the transmission output rotational speed No (the vehicle speed VSP), the integrated controller 20 selects the operation mode (the EV mode or the HEV mode) that can realize the drive torque of the vehicle desired by the driver, and, at the same time, the integrated controller calculates the target engine torque tTe, the target motor/generator torque tTm, the target motor/generator rotational speed tNm, the target first clutch torque transfer capacity tTc1, and the target second clutch torque transfer capacity tTc2, respectively.

The target engine torque tTe is sent to the engine controller 21, and the target motor/generator torque tTm and the target motor/generator rotational speed tNm are sent to the motor/generator controller 22.

The engine controller 21 controls the engine 1 so that the engine torque Te becomes the target engine torque tTe, and the motor/generator controller 22 controls the motor/generator 5 via the battery 9 and the inverter 10 so that the torque Tm and the rotational speed Nm of the motor/generator 5 become the target motor/generator torque tTm and the target motor/generator rotational speed tNm, respectively.

The integrated controller 20 controls the engagement forces of the first clutch 6 and the second clutch 7 individually so that solenoid currents corresponding to the target first clutch torque transfer capacity tTc1 and the target second clutch torque transfer capacity tTc2 are fed to the engagement control solenoids (not shown in the figure) of the first clutch 6 and the second clutch 7, respectively, and so that the torque transfer capacity Tc1 of the first clutch 6 becomes in agreement with the target torque transfer capacity tTc1, and the torque transfer capacity Tc2 of the second clutch 7 becomes in agreement with the target second clutch torque transfer capacity tTc2.

Figure 3:
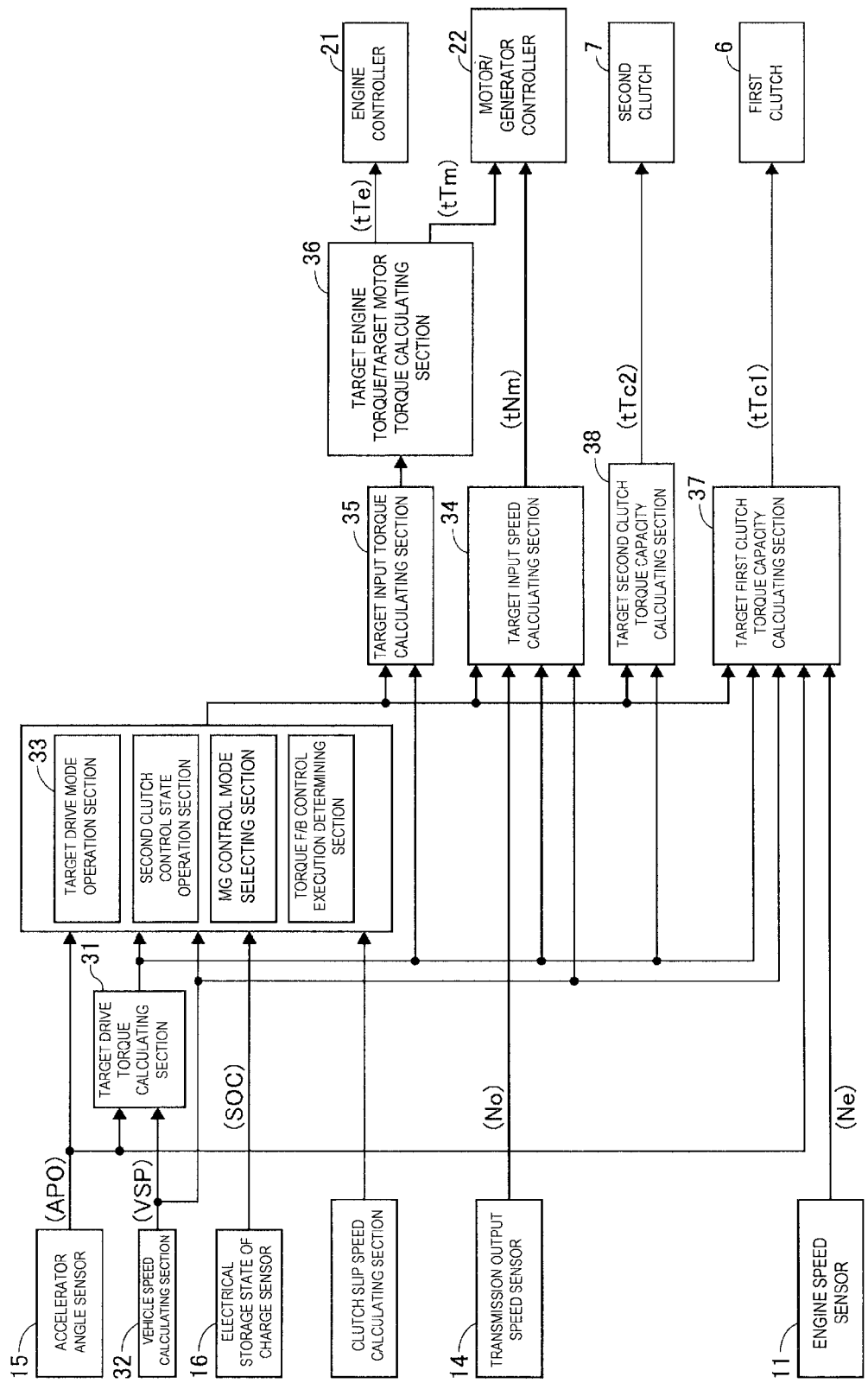
FIG. 3 is a block diagram illustrating the functions of the integrated control system in the control system shown in FIG. 2.
Figure 4:
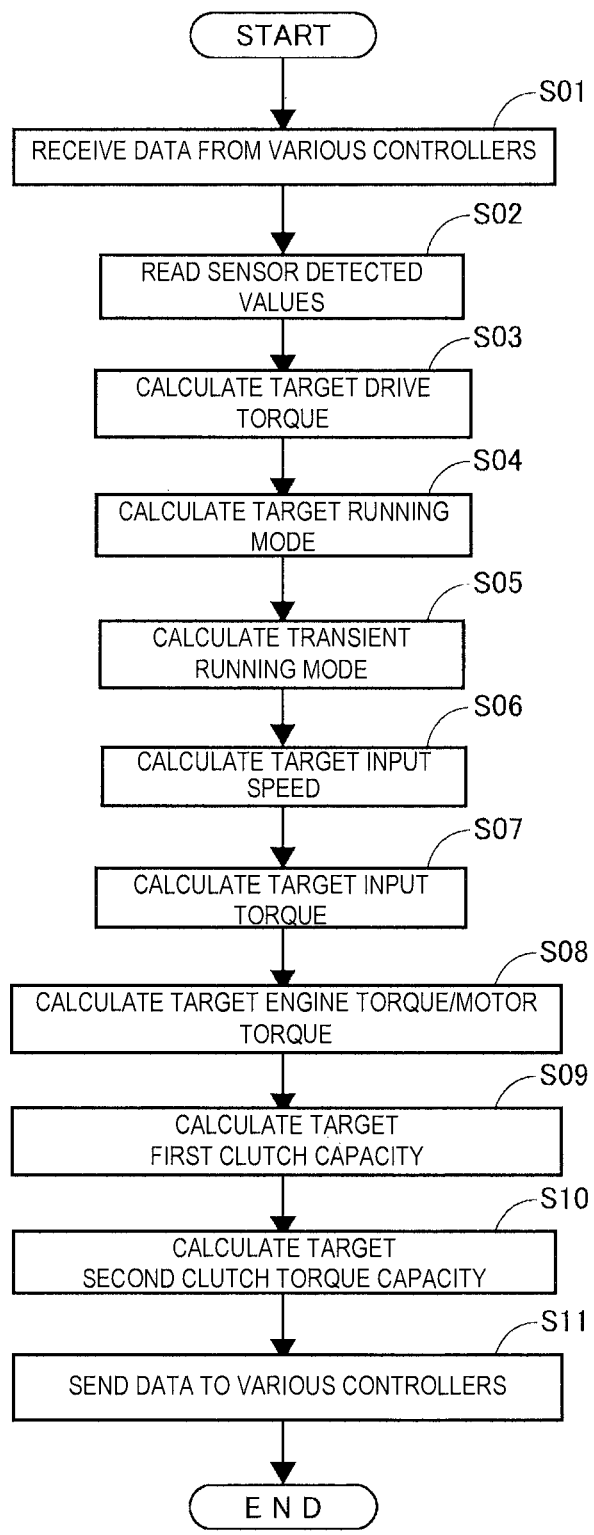
FIG. 4 is a flowchart illustrating the main routine of the power train control including the engine start control in one embodiment of the present invention carried out by the integrated control system shown in FIG. 3.

As shown in FIG. 3, a block diagram illustrating the functions, the integrated controller 20 carries out the selection of the operation mode described above (the EV mode and the HEV mode), calculating of the target engine torque tTe, the target motor/generator torque tTm, the target motor/generator rotational speed tNm, the target first clutch torque transfer capacity tTc1, and the target second clutch torque transfer capacity tTc2, as well as the control of the engine start as the purpose of the present invention according to the control program shown in FIG. 4.

As shown in FIG. 4, first of all, in step S01, the data from the engine controller 21 and the motor/generator controller 22 are received; in the next step S02, the detected values of the various sensors 11 through 17 are read. Then, in step S03 (the target drive torque calculating section 31), from the vehicle speed VSP calculated with the vehicle speed calculating section 32 and the accelerator position opening APO (the brake manipulation force in brake operation), using a prescribed target drive torque map, the target drive torque required by the driver in the driving operation is calculated.

Figure 5:
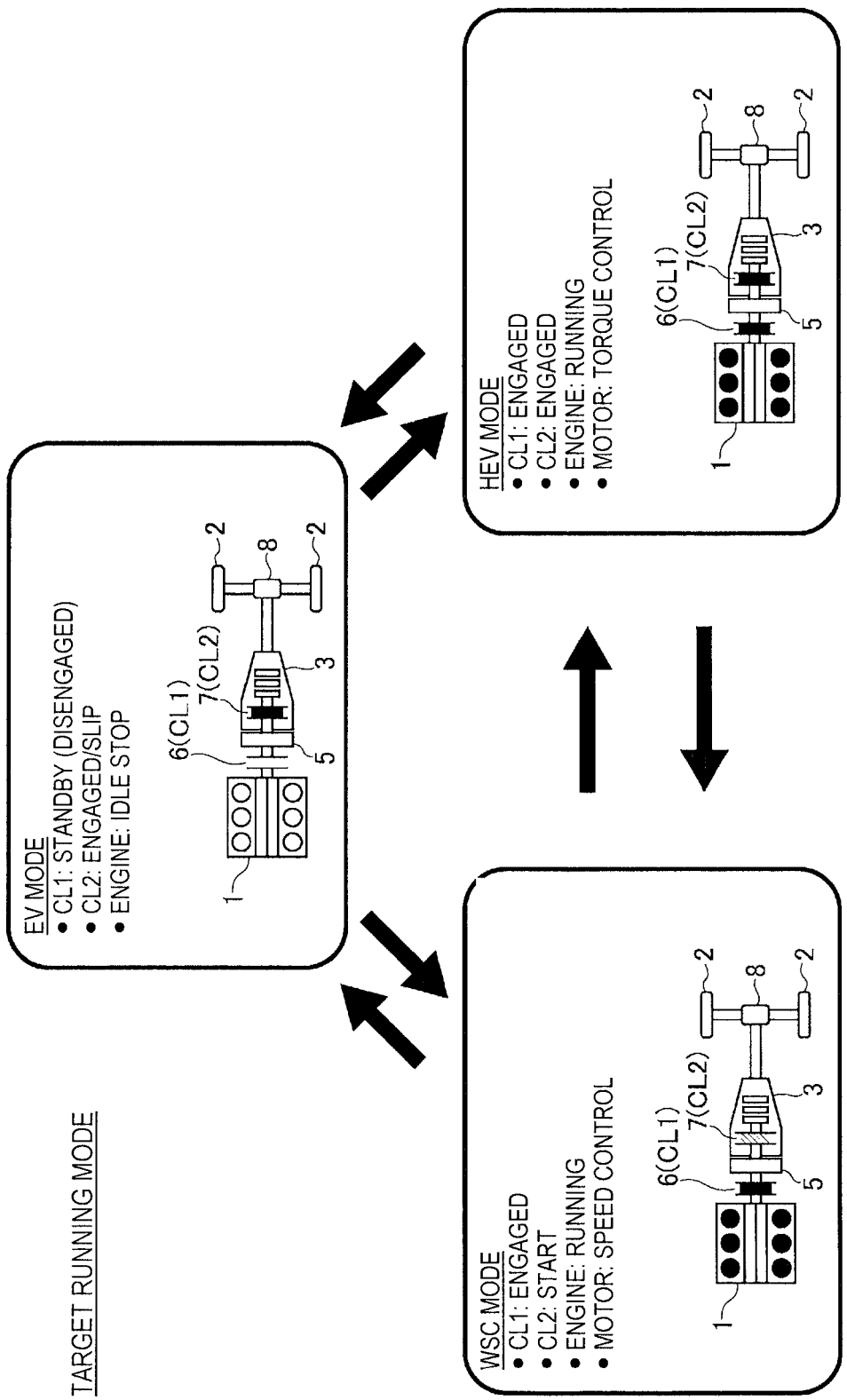
FIG. 5 is a diagram illustrating a variation in the state related to the target running mode of the hybrid vehicle.

In the next step S04 (the target running mode operation section 33), based on the target drive torque described above, the battery electrical storage state of charge SOC, the accelerator position opening APO, the vehicle speed VSP, and other vehicle driving state parameters, and using a prescribed target running mode map, the target running mode is determined by the operation. As shown in FIG. 5, as far as the running modes are concerned, in addition to the electrically driven drive (EV) mode and the hybrid drive (HEV) mode described above, a transient drive (WSC) mode is set in the switching transient period between the electrically driven drive (EV) mode and the hybrid drive (HEV) mode.

As shown in FIG. 5, in the electrically driven drive (EV) mode, the engine 1 is maintained in the shutdown state, while the first clutch 6 (CL1) is disengaged, the second clutch 7 (CL2) is engaged, or the automatic transmission 3 is set in the corresponding gear shift step selected state (the power transmitting state) by the slip engagement; only the rotation output from the motor/generator 5 is transmitted to the rear wheels 2 after being subject to gear shifting by the automatic transmission 3.

As shown in FIG. 5, similarly, in the hybrid drive (HEV) mode, while the automatic transmission 3 is maintained in the corresponding gear shift step selection state (the power transmitting state) by the engagement of the second clutch 7 (CL2), the first clutch 6 (CL1) is also engaged, and both the rotation output from the engine 1 in the start state and the rotation output from the motor/generator 5 under the torque control are subject to gear shifting by the automatic transmission 3 and then transmitted to the rear wheels 2.

As shown in the transient drive (WSC) mode shown in FIG. 5, when mode switching is carried out from the hybrid drive (HEV) mode to the electrically driven drive (EV) mode, the second clutch 7 (CL2) is changed from the fully engaged state to the slip engaged state; while the motor/generator 5 is subject to the rotational speed control, the first clutch 6 (CL1) is disengaged, and, at the same time, the engine 1 is shutdown, so that the switch to the electrically driven drive (EV) mode is ended.

When the switch is made from the electrically driven drive (EV) mode to the hybrid drive (HEV) mode, as indicated by the transient drive (WSC) mode in FIG. 5, the automatic transmission 3 is maintained in the corresponding gear shift step selection state (the power transmitting state) by the slip engagement of the second clutch 7 (CL2) as is, while the engine 1 is started to be the start state by the engagement control of the first clutch 6 (CL1) and the rotational speed control of the motor/generator 5, and the switch to the hybrid drive (HEV) mode is ended.

In this embodiment, the start of the engine 1 is carried out when the mode switching of EV→HEV is carried out as to be explained in detail later.

Figure 6:
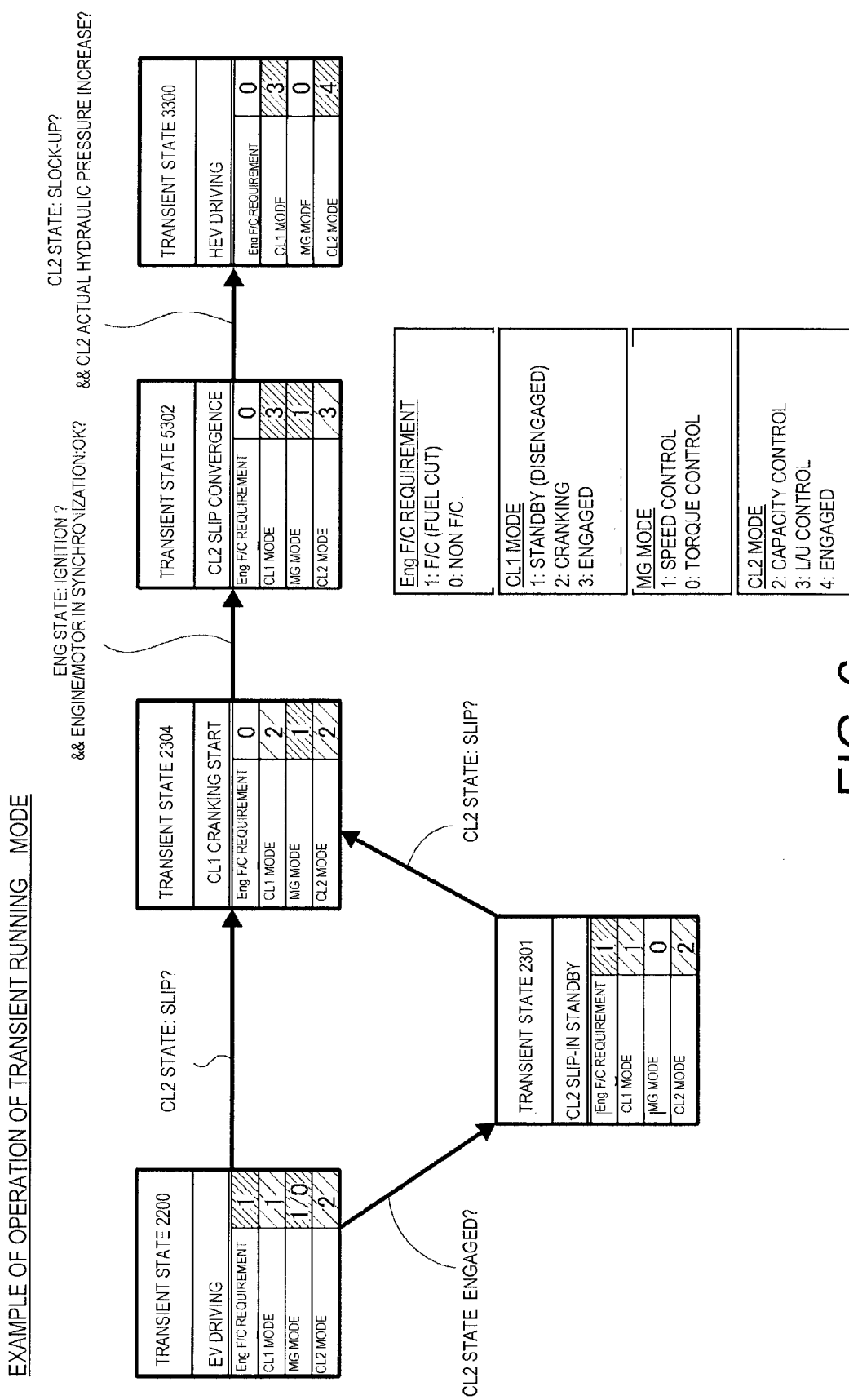
FIG. 6 is a diagram illustrating a variation in the state showing an example of the operation related to the target running mode of the hybrid vehicle.

In step S05, corresponding to the state of the first clutch 6 (CL1) and the second clutch 7 (CL2) when the engine is started, the transient running mode operation is carried out as shown in FIG. 6, for example, by selecting the motor control mode of the motor/generator 5 and the start timing of the engine 1. As the transient running mode, the state of each device is switched, and the driving state is managed corresponding to the slip state of the first clutch 6 (CL1) and the second clutch 7 (CL2) and the complete ignition state of the engine 1.

Figure 7:
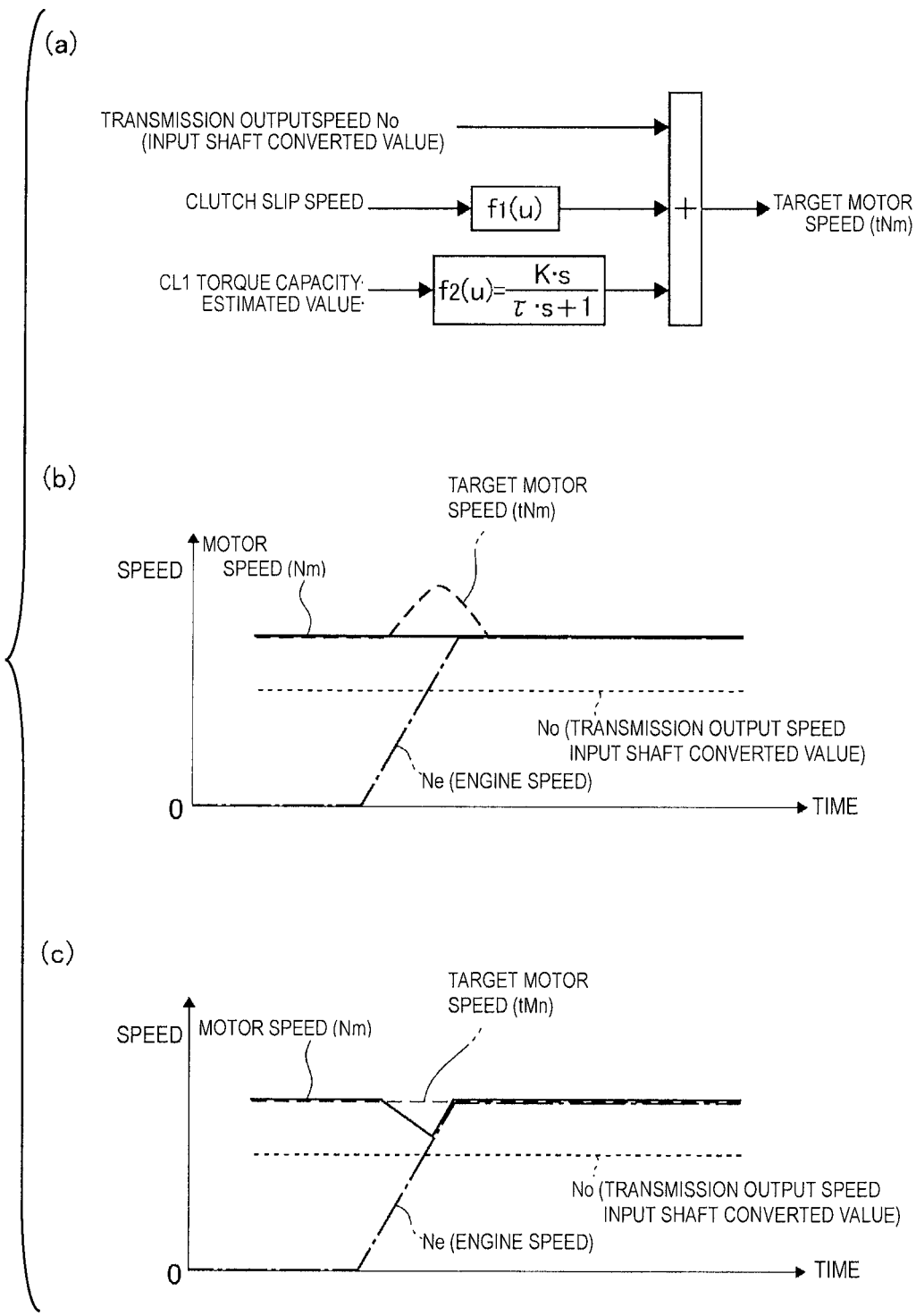
FIG. 7 shows the main points for calculating the target motor rotational speed of the hybrid vehicle. (a) is a block diagram illustrating the functions of the portion related to the process for calculating the target motor rotational speed. (b) is a time chart illustrating the time sequence variation in the target motor rotational speed when the engine start control is carried out in one embodiment of the present invention. (c) is a time chart illustrating the time sequence variation in the target motor rotational speed when the engine start control of one embodiment of the present invention is not carried out.

In step S06 (the target input rotational speed calculating section 34), corresponding to the driving state and the motor control state determined in step S05, the target input rotational speed (the target motor rotational speed tNm) is calculated as shown in part (a) of FIG. 7. That is, the input shaft converted value of the output shaft rotational speed No is added to the value obtained by treating the clutch slip rotational speed by a filter $f_1(u)$ and the rotational speed corresponding to the torque capacity of the first clutch (CL1), that is, the value obtained by the process of the torque capacity of the first clutch (CL1) by a filter $f_2(u)$, and the sum of these three values is taken as the target input rotational speed (the target motor rotational speed tNm).

Here, the filter $f_1(u)$ works as follows: in the case of the engine cranking while the first clutch 6 is being engaged (the transition state 2304 shown in FIG. 6), the value obtained by the process of the clutch slip rotational speed with filter $f_1(u)$ is maintained as the clutch slip rotational speed as is so that the second clutch 7 is allowed to slip; after the complete ignition so that the engine can carry out stand-alone operation, and the slip of the second clutch 7 is converged in the transition state 5302 shown in FIG. 6, the value obtained by the process of the clutch slip rotational speed with the filter $f_1(u)$ is set so that the slip of the second clutch 7 converges. For the slip convergence of the second clutch 7, in consideration of the clutch robustness, of course, having the target input rotational speed (the target motor rotational speed tNm) set appropriately to ensure that the angular acceleration of the slip rotational speed changes slowly is preferable.

The filter $f_2(u)$ is for determining the rotational speed that is increased, as indicated by the broken line in FIG. 7(b), for the target input rotational speed (the target motor rotational speed tNm) corresponding to the increase in the torque capacity of the first clutch (CL1) (the increase in the engine rotational speed Ne), and the filter has the following transmission function using the same time constant τ as the time constant of the rotational speed control system.

$$f_2(u)=K\cdot s/(\tau\cdot s+1)$$

In this connection, the increase in the rotational speed indicated by the broken line in FIG. 7(b) is not carried out. Instead, the target input rotational speed (the target motor rotational speed tNm) is set as that indicated by the broken line in part (c) of FIG. 7, so that the motor rotational speed Nm temporarily decreases as indicated by the solid line in part (c) of FIG. 7. Such a temporary decrease in the motor rotational speed Nm leads to an increase in the motor torque for the first clutch 6, and, corresponding to this increase, the motor torque for the second clutch 7 during slip decreases. As a result, quick engagement of the second clutch 7 takes place, and a shock is generated.

However, this problem can be avoided according to the present embodiment. As indicated by the broken line in part (b) of FIG. 7, the target input rotational speed (the target motor rotational speed tNm) is increased only corresponding to the portion of the filter process value by the filter $f_2(u)$ among the increase in the torque capacity of the first clutch (CL1) (the increase in the engine rotational speed Ne), so that the motor rotational speed Nm remains unchanged without the temporary decrease as indicated by the solid line in part (b) of FIG. 7. As a result, it is possible to avoid the problem of the quick engagement and the generation of a shock of the second clutch 7, which is in the slip state, caused by the decrease in the motor torque as the motor torque increases for the first clutch 6 due to the temporary decrease in the motor rotational speed Nm.

In step S07 (the target input torque calculating section 35), while protection of the various types of devices is considered, the target input torque for realizing the target drive torque determined in step S03 (the target drive torque calculating section 31) is calculated.

In step S08 (the target engine torque/target motor torque calculating section 36), while considering the target input torque calculated in step S07 and the requirement of the electric power generation by the motor/generator 5, the torque distribution to the engine 1 and the motor/generator 5 is determined; based on the distribution, the target engine torque tTe and the target motor torque tTm are calculated.

Figure 8:
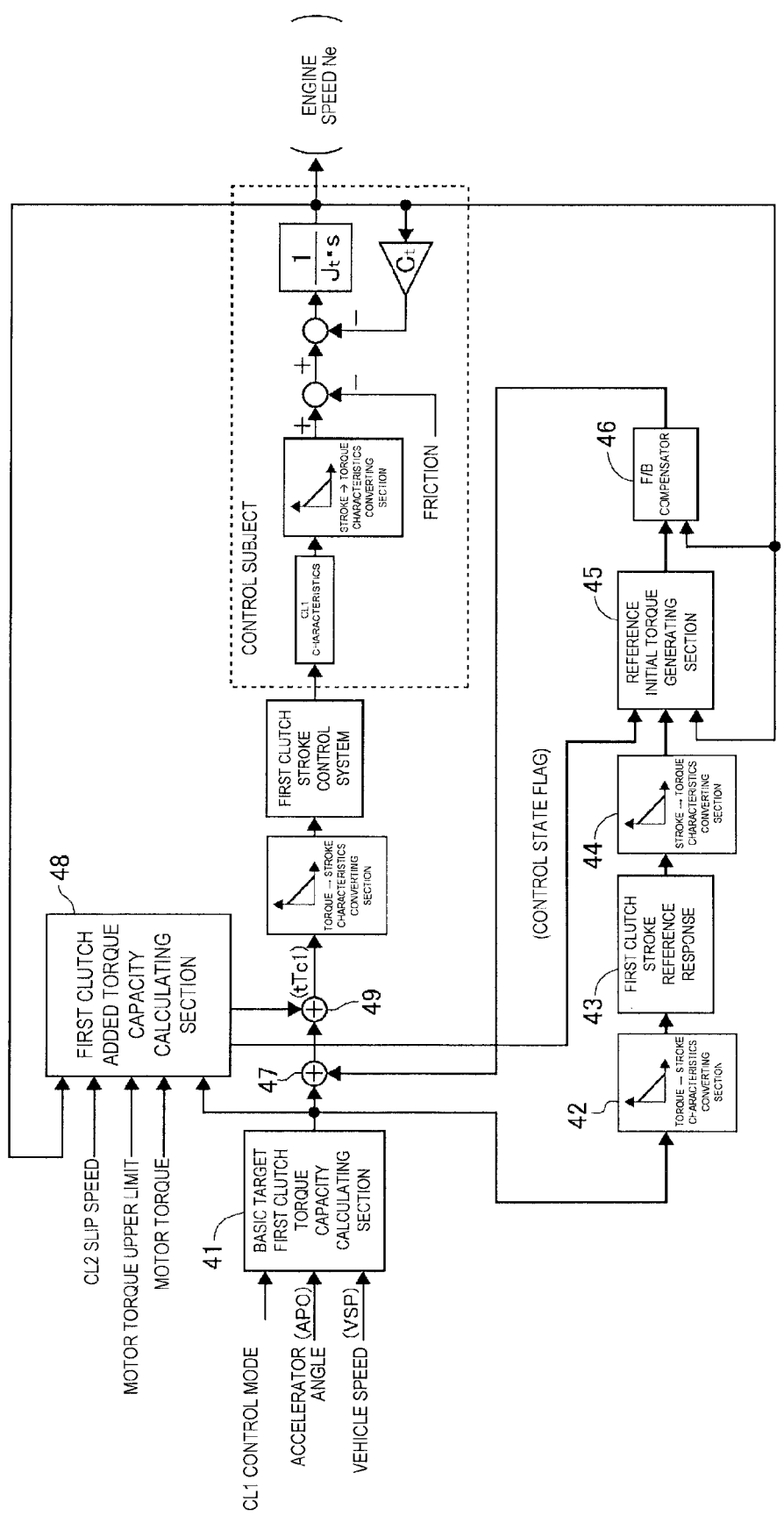
FIG. 8 is a block diagram illustrating the functions related to the process for calculating the target first clutch torque capacity when the engine start control is carried out in one embodiment of the present invention.
Figure 9:
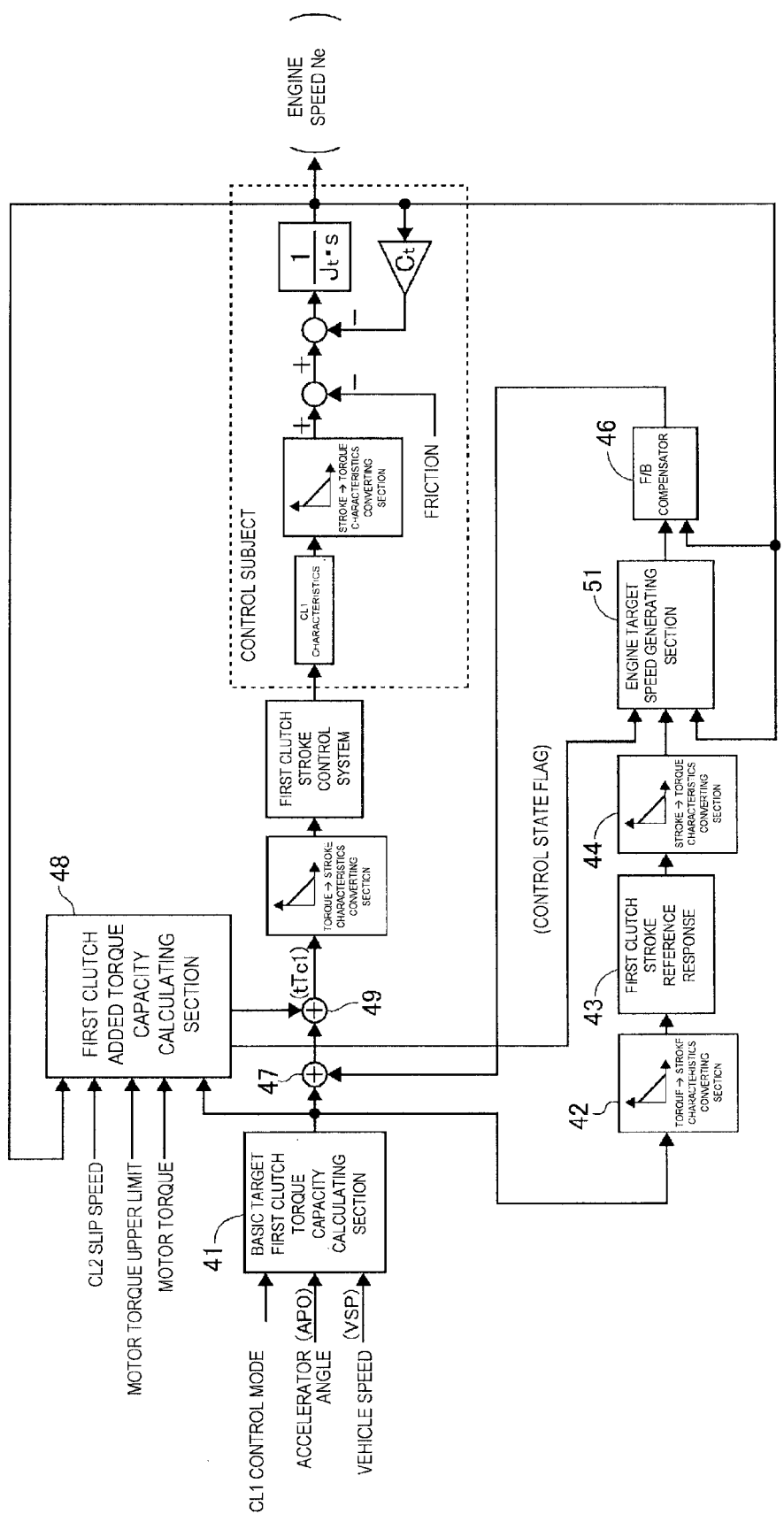
FIG. 9 is a block diagram illustrating the same functions as those in FIG. 8 in a modified example related to the process for calculating the target first clutch torque capacity.

Step S09 (the target first clutch torque capacity calculating section 37) corresponds to the first clutch engagement control means for the engine start in present invention. Here, corresponding to the vehicle driving state and the engine rotational speed determined in step S05, the target first clutch torque transfer capacity tTc1 is calculated as shown in FIG. 8 or FIG. 9. In the examples of calculating shown in FIG. 8 and FIG. 9, the diamphrag spring of a dry type clutch is controlled by the piston stroke. They show the system and compensator for realizing the torque capacity of the first clutch 6.

In the basic target first clutch torque capacity calculating section 41, based on the control mode of the first clutch 6 (CL1), the accelerator position opening APO (the required load) and the vehicle speed VSP, the basic target first clutch torque capacity is calculated.

In the example of calculating shown in FIG. 8, when the basic target first clutch torque capacity described above is realized by means of the torque→stroke characteristics converting section 42, the first clutch stroke standard response 43, the stroke→torque characteristics converting section 44, the standard initial torque generating section 45, and the feedback (F/B) compensator 46, the feedback (F/B) compensation quantity needed for realizing the standard initial torque generated by the standard initial torque generating section 45 is determined.

In the example of calculating shown in FIG. 9, when the basic target first clutch torque capacity described above is realized by means of the torque→stroke characteristics converting section 42, the first clutch stroke standard response 43, the stroke→torque characteristics converting section 44, the target engine rotational speed generating section 51, and the feedback (F/B) compensator 46, the feedback (F/B) compensation quantity needed for realizing the target engine rotational speed generated by the target engine rotational speed generating section 51 is determined.

In both the calculating operations shown in FIGS. 8 and 9, the feedback (F/B) compensation quantity from the feedback (F/B) compensator 46 determined as described above is added to the basic target first clutch torque capacity from the basic target first clutch torque capacity calculating section 41 by the adder 47 to determine the corrected basic target first clutch torque capacity.

From the engine rotational speed Ne, the slip rotational speed of the second clutch 7 (CL2), the motor torque upper limit and the motor torque of the motor/generator 5, and the basic target first clutch torque capacity, the first clutch added torque capacity calculating section 48 determines the added torque capacity of the first clutch 6 needed for excluding the influence by the cranking compressive reactive force at the engine start for switching from the EV→HEV mode.

As an explanation of the influence of such a compressive reactive force, the compressive reactive force increases the engine rotational speed increasing torque needed for increasing the rotational speed of the engine during cranking, and an increase in the engine rotational speed increasing torque can be almost ignored when the engine rotational speed is high and the rotation inertia is large. However, the increase in the engine rotational speed increasing torque cannot be ignored while the rotation inertia is small during the period when the engine rotational speed is still low.

Figure 14:
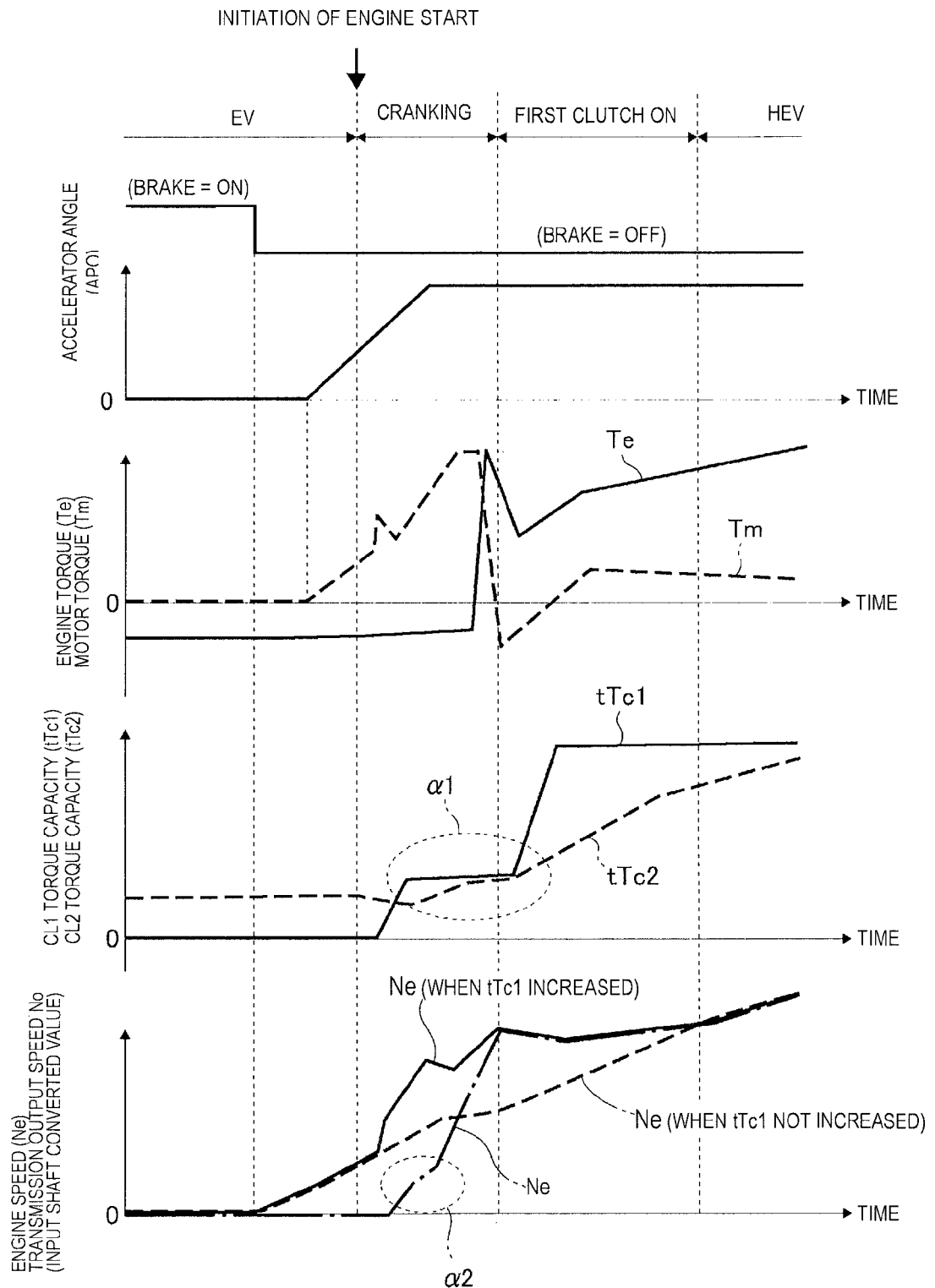
FIG. 14 is an operation time chart illustrating the conventional engine start control in the prior art.

In the low engine rotational speed region wherein an increase in the engine rotational speed increasing torque is large under the influence of such a compressive reactive force, the torque capacity tTc1 of the first clutch 6 is maintained at a prescribed low level as indicated by α1 shown in FIG. 14. As indicated by α2 in FIG. 14, as can be seen from the variation over time of the engine rotational speed Ne in the region where the cranking compressive reactive force increases, the rise of the engine rotational speed Ne is slow, and a delay in the start takes place. In order to prevent this problem, people have proposed a scheme to increase the torque capacity tTc1 of the first clutch to the prescribed constant value. However, in this case, although the start response is good, the portion of the motor torque that can be distributed via the second clutch 7 to the drive wheels 2 side becomes smaller corresponding to the increase in the torque capacity tTc1. For example, the engine starts when the mode switch takes place from EV→HEV due to the compression of the accelerator pedal, which causes a decrease in the drive torque, and poor acceleration takes place.

As indicated by α1 in FIG. 14, if the target first clutch torque transfer capacity tTc1 is not increased in order to solve this problem, due to the insufficiency in the cranking torque, then the engine start time becomes longer; due to the variation in the engine start time, the acceleration feeling becomes unstable. This is undesirable.

According to the present embodiment, in order to solve the problem described above, when the engine rotates and the influence described above cannot be ignored due to the compressive reactive force as the engine starts, the engine rotational speed during cranking is quickly increased to the high engine rotational speed region where an increase in the engine rotational speed increasing torque caused by the influence of the compressive reactive force can be ignored. The added torque capacity of the first clutch 6 determined by the first clutch added torque capacity calculating section 48 shown in FIGS. 8 and 9 is for realizing the purpose described above. Here, the adder 49 adds the first clutch added torque capacity to the corrected basic target first clutch torque capacity described above, and the sum of the two capacities is taken as the target first clutch torque transfer capacity tTc1 of the first clutch 6 for controlling the engagement force when the engines starts.

That is, according to the present embodiment, during the engine start operation with the switch from the EV→HEV mode, whether cranking of the engine 1 or the drive torque should be taken as the priority is determined corresponding to the state of the engine rotational speed Ne, etc.; corresponding to the determination, the target first clutch torque transfer capacity tTc1 is controlled and is adopted in controlling the engagement capacity of the first clutch 6 when the engine starts.

When the cranking of the engine 1 is taken as the priority, in order to exclude the influence by the compressive reactive force described above and to have the engine rotational speed during cranking quickly increased to the high engine rotational speed region where the increase in the engine rotational speed increasing torque due to the influence of the compressive reactive force can be ignored, the necessary first clutch added torque capacity is determined and is added to the corrected basic target first clutch torque capacity. In this way, the first clutch torque capacity increase process is carried out.

Figure 10:
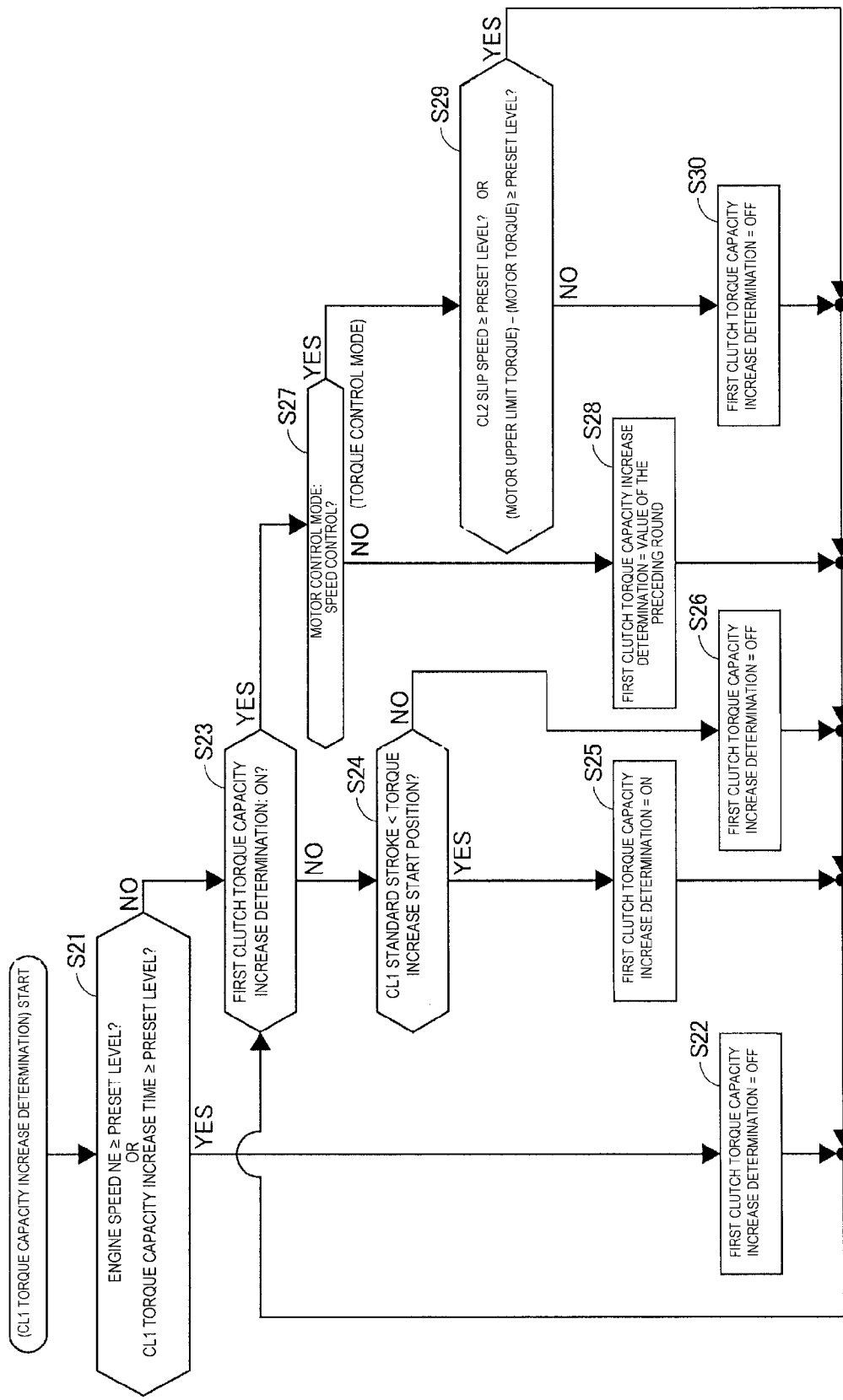
FIG. 10 is a flow chart illustrating the increase determination process of the first clutch torque capacity carried out when the engine start control is executed in one embodiment of the present invention.

The determination regarding whether the first clutch capacity increase process should be carried out is made as shown in FIG. 10. First, in step S21, whether the engine rotational speed Ne is over a preset level for determining the high engine rotational speed region described above is checked, and whether the time for increasing the first clutch torque capacity longer than the preset time, over which time is meaningless even when the torque capacity increase process of the first clutch is carried out, is also checked. When the engine rotational speed Ne is over the aforementioned preset level, or the time for increasing the first clutch torque capacity is longer than the preset time described above, there is no need to increase the first clutch torque capacity, so that the result is OFF for the determination of the increase in the first clutch capacity in step S22.

In step S21, when a determination is made that the engine rotational speed Ne is lower than the preset level during the period when the time for increasing the first clutch torque capacity is within the preset time, in step S23, whether the determination of the increase in the first clutch capacity becomes ON is checked. If the determination of the increase in the first clutch torque capacity is not ON, in step S24, a determination is made whether the standard stroke of the first clutch 6 (CL1) is right before the torque increase start position. If the determination result is YES in step S25, the determination of the increase in the first clutch torque capacity is turned ON; if the standard stroke of the first clutch 6 (CL1) reaches the torque increase start position, in step S26, the determination of the first clutch torque capacity increase is turned OFF.

In step S23, when the determination of the increase in the first clutch torque capacity becomes ON, in step S27, whether the motor control mode of the motor/generator 5 is in the rotational speed control mode is checked. If the motor/generator is in the torque control mode instead of the rotational speed control mode in step S28, the determination of the increase in the first clutch capacity is maintained at the value of the preceding round as is. When a determination is made in step S27 that the motor control mode is the rotational speed control mode, in step S29, whether the slip rotational speed of the second clutch 7 is over the preset level is checked, and whether the motor torque margin obtained by subtracting the motor torque from the motor upper torque limit is over the preset level is checked.

In step S29, when a determination is made that the slip rotational speed of the second clutch 7 is over the preset level and the motor torque margin obtained by subtracting the motor torque from the motor upper torque limit is over the preset level, the control is ended as is, and ON of the first clutch torque capacity increase determination is continued. In step S29, when a determination is made that the slip rotational speed of the second clutch 7 is lower than the preset level or the motor torque margin obtained by subtracting the motor torque from the motor upper torque limit is lower than the preset level, the first clutch torque capacity increase determination is set as OFF in step S30.

As the control system of the first clutch 6, in order to suppress the variation in the engine start time, the engine rotational speed Ne is used to correct the torque command. The torque for increasing the engine rotational speed or the rotational speed time sequence variation is calculated corresponding to the target first clutch torque transfer capacity tTc1. In the method of the calculating, one may use a model in consideration of the moment of inertia of the engine and the friction/viscosity, and one may consider the case when a map or another scheme that is predetermined is adopted. However, when the compressive reactive force or another nonlinear torque is adopted in such calculating, because the standard inertia torque or the target rotational speed changes drastically, the command value may correspondingly change drastically. Consequently, the command for decreasing the influence of the compressive reactive force is reflected in the target torque adopted in calculating the hydraulic pressure command. However, the command for decreasing the influence of the compressive reactive force is not reflected in the torque for increasing the engine rotational speed or the target torque for determining the rotational speed time sequence variation.

Figure 11:
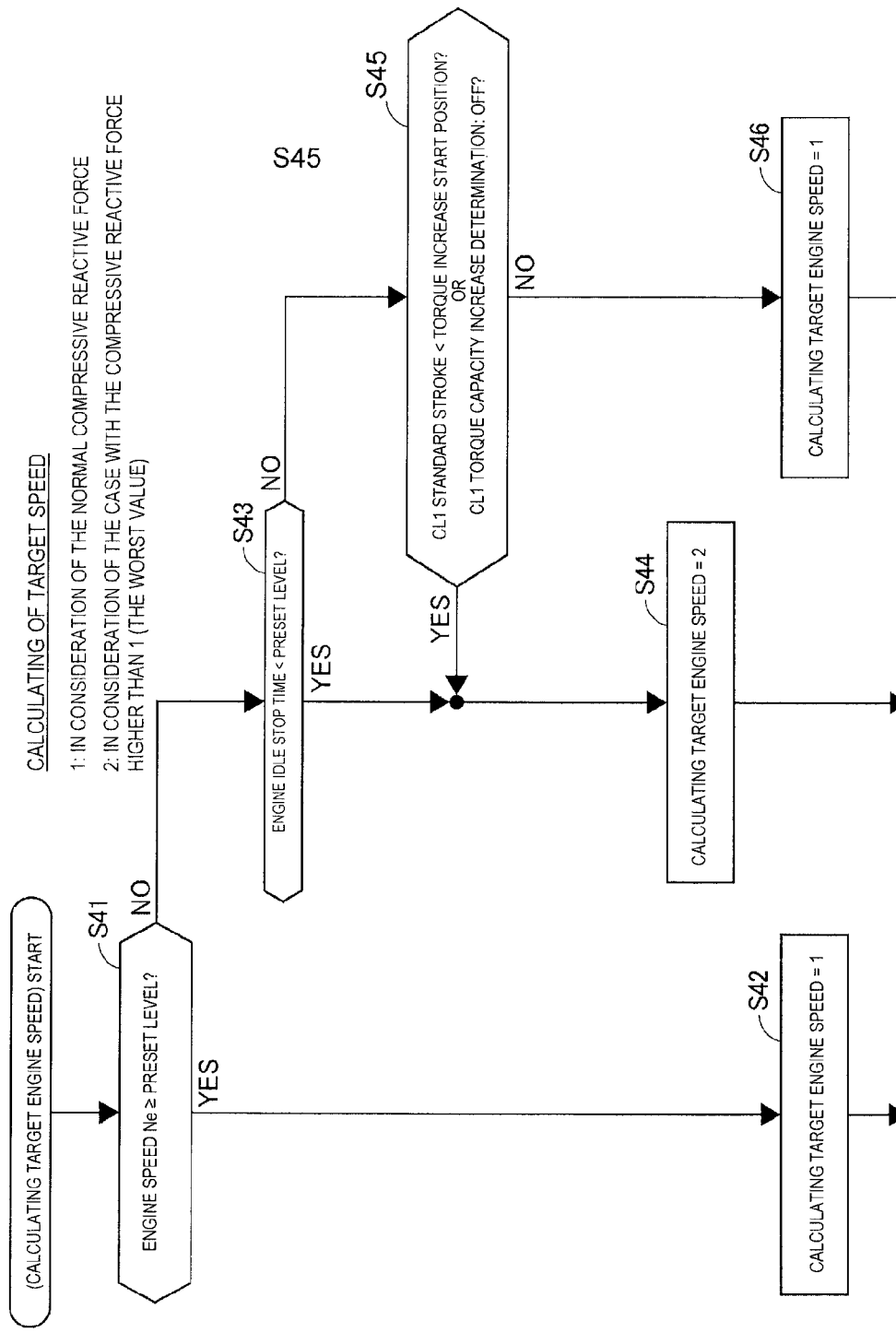
FIG. 11 is a flow chart illustrating the process for calculating the target engine rotational speed carried out in calculating the target first clutch torque capacity shown in FIG. 9.

As shown in FIG. 11, the target engine rotational speed generated by the target engine rotational speed generating section 51 in the example of calculating shown in FIG. 9 is calculated to become the time sequence variation of the normal engine rotational speed increasing torque (the inertia torque); under the condition that a shock in the slip engagement of the second clutch 7 may take place, calculation is carried out to become the time sequence variation where the engine rotational speed torque (the inertia torque) is lower than that of the normal case.

That is, in step S41, when a determination is made that the engine rotational speed Ne is in the high rotational speed region over a prescribed level free of the influence of the compressive reactive force, in step S42, calculating the target engine rotational speed is set as "1" corresponding to the normal compressive reactive force. In step S41, when a determination is made that the engine rotational speed Ne is in the low rotational speed region lower than a prescribed level under the influence of the compressive reactive force, in step S43, whether the engine shutdown position is at a shutdown position with a high compressive reactive force is checked by determining whether the engine shutdown time is shorter than a prescribed time. If a determination is made that the engine shutdown position is at a high compressive reactive force, in step S44, the result of calculating the target engine rotational speed is set at "2" corresponding to the compressive reactive force higher than the normal case.

In step S43, when a determination is made that the engine shutdown time is longer than a prescribed time (the engine shutdown position with a normal compressive reactive force), in step S45, whether the standard stroke of the first clutch 6 is shorter than the torque increase start position is checked, and whether the determination of the first clutch torque capacity increase is OFF is also checked. If the standard stroke of the first clutch 6 is shorter than the torque increase start position, and the determination of the first clutch torque capacity increase is OFF, the compressive reactive force becomes higher, so that in step S44, calculating the target engine rotational speed is set at "2" corresponding to a compressive reactive force higher than the normal case. When the standard stroke of the first clutch 6 is longer than the torque increase start position, or when the determination of the first clutch torque capacity is ON, the compressive reactive force does not become higher, so that the calculating of the target engine rotational speed in step S46 is set at "1" corresponding to the normal compressive reactive force.

As shown in FIG. 10, when a determination is made that the self-standing operation is carried due to the complete ignition of the engine 1, the determination of the first clutch torque capacity increase is turned to OFF. Consequently, the target first clutch torque transfer capacity tTc1 is being decreased due to stopping of the increase. In this case, the target first clutch torque transfer capacity tTc1 is determined corresponding to the accelerator position opening APO (the required load) and the vehicle speed VSP.

As shown in FIG. 4, in step S10 (the target second clutch torque capacity calculating section 38 in FIG. 3), the target second clutch torque transfer capacity tTc2 is calculated corresponding to the transient running mode, the state of the second clutch 7 and the slip rotational speed determined in step S05. In step S11, the various results of the calculations produced above, tTe, tTm, tNm, tTc1, and tTc2, are sent to the various controllers, respectively, as shown in FIG. 3.

Figure 12:
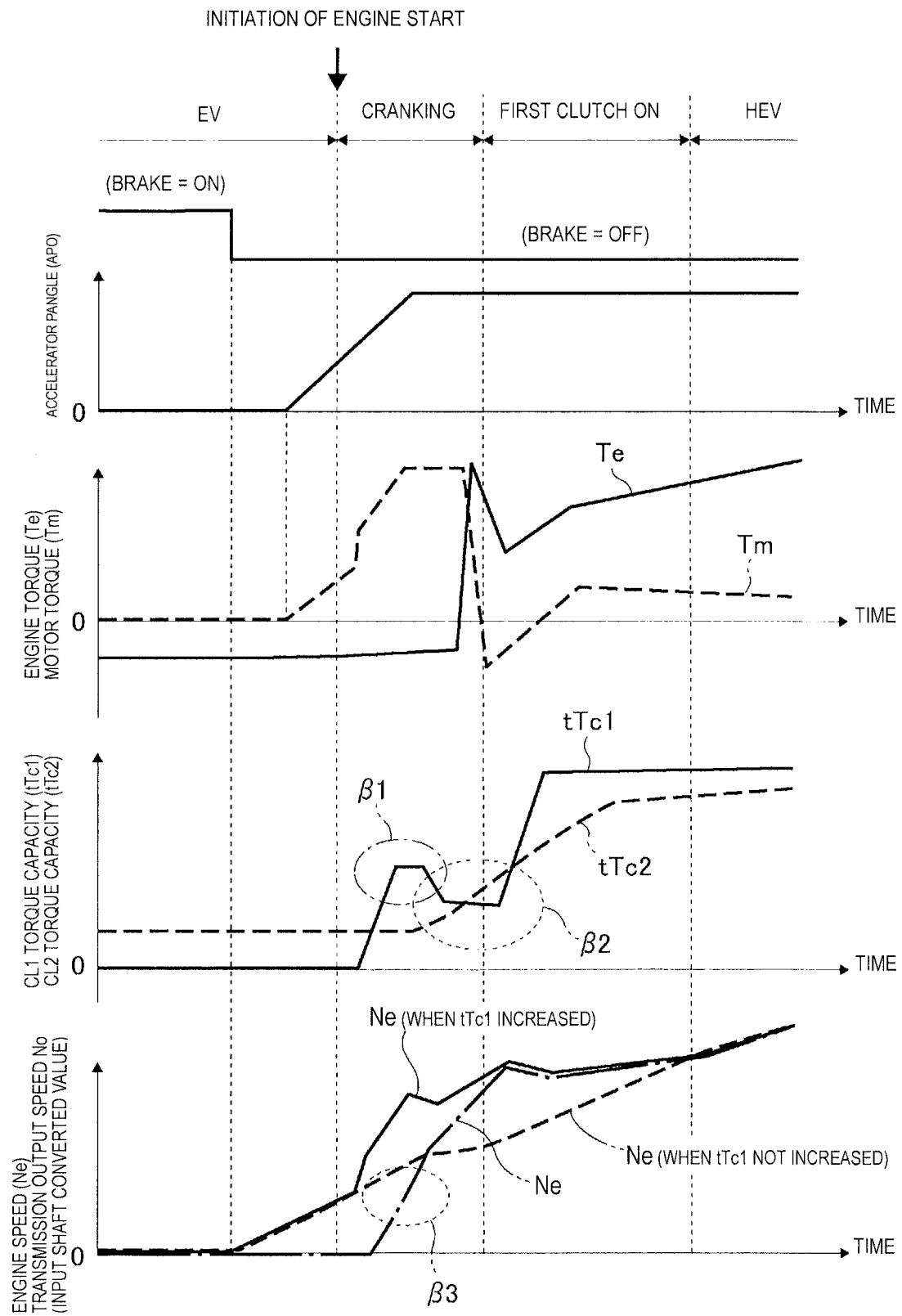
FIG. 12 is an operation time chart of the engine start control in one embodiment of the present invention.

In the engine start control system of the hybrid vehicle in the embodiment described above, when the mode switching is carried out from EV→HEV and the engine is started due to progress in the engagement of the first clutch 6, as indicated by β1 in FIG. 12, the torque capacity tTc1 of the first clutch 6 is increased; then, when the engine rotational speed reaches the high-speed region described above, the target first clutch 6 torque transfer capacity tTc1 is decreased as indicated by β2 in FIG. 12, so that the engine rotational speed Ne is increased within a prescribed time to a high-speed region where the influence of the compressive reactive force of the engine can be ignored. Consequently, as shown in FIG. 12, as the engine is started, the engine rotational speed Ne is increased to the target first clutch torque transfer capacity tTc1 as explained above, so that the speed is increased within a prescribed time (quickly) to a high-speed region where the influence of the compressive reactive force of the engine can be ignored, as can be seen from the time sequence change indicated by the dot-dash line of the engine rotational speed Ne.

Consequently, it is possible to quickly pass through the low engine rotational speed region as the speed is quickly increased to the region where the engine rotational speed increasing torque under the influence of the compressive reactive force of the engine 1 can be ignored. As a result, there is no need to increase the torque capacity of the first clutch 6 corresponding to the increase in the engine rotational speed increasing torque described above. Consequently, there is no decrease in the portion of the motor torque that can be distributed via the second clutch 7 to the drive wheels 2 side, and it is thus possible to avoid the problem of poor acceleration caused by a decrease in the drive torque when the engine is started with the switch from the EV mode to the HEV mode. This can be seen clearly from the smooth time sequence increase variation in the engine rotational speed Ne indicated by β3 in FIG. 12.

Figure 13:
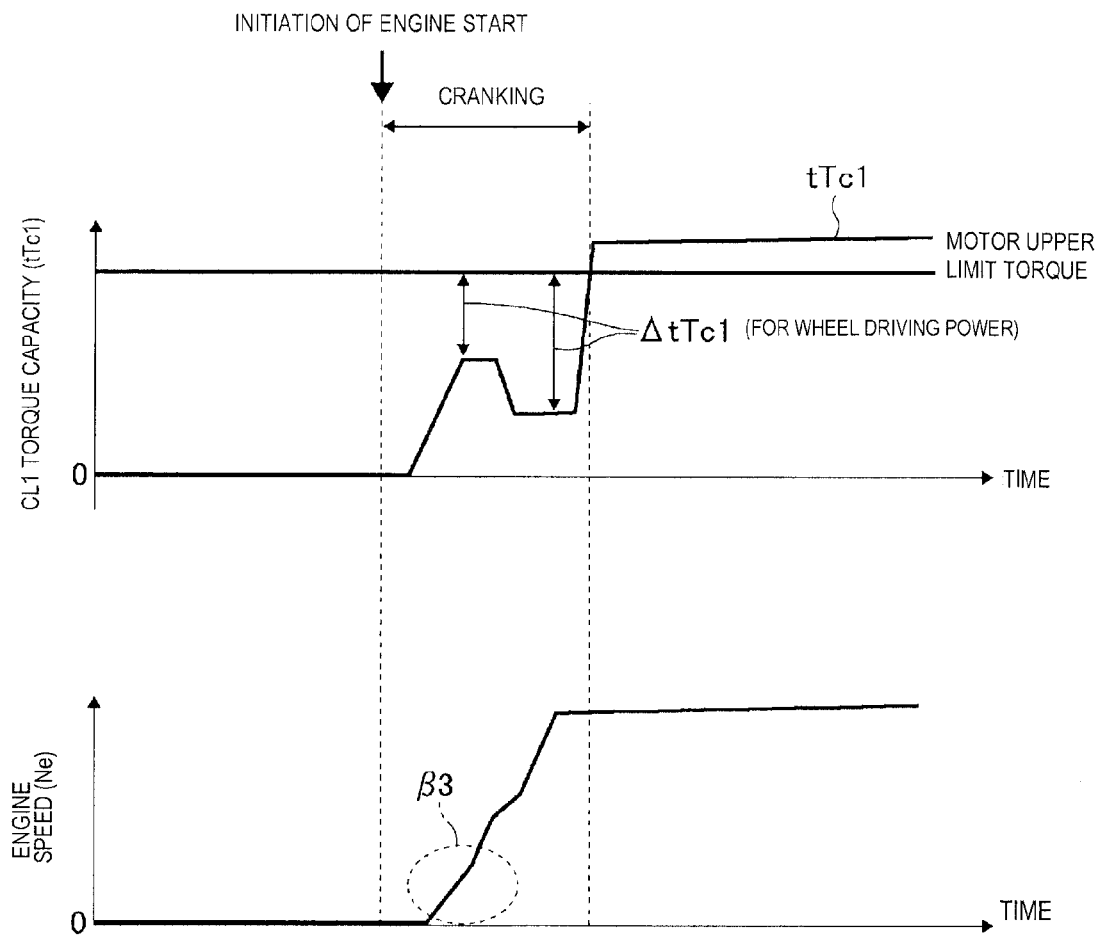
FIG. 13 is a time chart illustrating only the main portion of the operation time chart shown in FIG. 2.

According to the present embodiment, although the torque capacity tTc1 of the first clutch 6 is increased as indicated by β1 in FIG. 12, the time is merely an instant at start of the engine because the time is only for increasing the engine rotational speed Ne to the high-speed region described above within a prescribed time (quickly) at start for the increase 31 of the target first clutch torque transfer capacity tTc1. Consequently, the time for the torque that can be used in driving the wheels as indicated by ΔtTc1 in FIG. 13; that is, the difference in torque between the first clutch torque transfer capacity tTc1 and the motor upper torque limit to decrease due to increase β1 of the first clutch torque transfer capacity tTc1 is also only the instant at the start of the engine. As a result, the increase β1 of the first clutch torque transfer capacity tTc1 does not cause poor acceleration; as can be seen from the smooth variation of the time sequence increase in the engine rotational speed Ne indicated by β3 shown in FIGS. 12 and 13, it is possible to carry out smooth acceleration in the switch from the EV mode to the HEV mode.

Also, at start of the engine, with the increase in the torque capacity of the first clutch 6, the engine rotational speed Ne is increased within a prescribed time (quickly) to the high-speed region free of the influence by the compressive reactive force described above. Consequently, it is possible to avoid the following problems: the slow increase of the engine rotational speed Ne due to insufficient cranking torque; the longer engine start time; and the unstable acceleration feeling due to variation in the engine start time.

In addition, according to the present embodiment, although the command for decreasing the influence of the compressive reactive force described above is reflected in the target torque adopted in calculating the hydraulic pressure command, the command is nevertheless not reflected in the torque for increasing the engine rotational speed or the target torque for determining the rotational speed time sequence variation. Consequently, it is possible to suppress stagnation in the engine rotational speed Ne and the rapid change in the angular acceleration; at the same time, it is possible to smoothly increase the engine rotational speed Ne from the shutdown state.

In addition, according to the present embodiment, the increase in the first clutch torque transfer capacity tTc1 for decreasing the influence of the compressive reactive force described above starts corresponding to the state of the hydraulic pressure and the stroke of the first clutch 6. Consequently, it is possible to increase the first clutch torque transfer capacity tTc1 at an appropriate time, and displaying the effects described above more significantly is possible.

In addition, according to the present embodiment, as the condition for the continuous increase of the first clutch torque transfer capacity tTc1 with the reduced influence of the compressive reactive force described above, in addition to the increase in the engine rotational speed Ne, the fact that the slip rotational speed of the second clutch 7 is over the preset level is also taken as the condition for the continuous increase in the first clutch torque capacity. Consequently, even when a dispersion takes place in the first clutch torque transfer capacity tTc1 when the cranking priority is adopted, it is still possible to prevent the decrease in the slip quantity of the second clutch 7, and preventing the shock caused by the engagement of the second clutch 7 is possible.

In addition, according to the present embodiment, as the condition for the continuous increase in the first clutch torque transfer capacity tTc1 with the decreased influence of the compressive reactive force described above, in addition to the increase in the engine rotational speed Ne, the following fact is also taken as the condition for the continuous increase in the first clutch torque capacity: the motor torque margin obtained by subtracting the motor torque from the motor torque upper limit value in the slip of the second clutch 7 is over the prescribed level. Consequently, even when dispersion takes place in the first clutch torque transfer capacity tTc1 when the cranking priority is adopted, it is still possible to prevent the decrease in the slip quantity of the second clutch 7, and preventing the shock caused by the engagement of the second clutch 7 is possible.

In addition, according to the present embodiment, as the condition for the continuous increase in the first clutch torque transfer capacity tTc1 for decreasing the influence of the compressive reactive force described above, in addition to the increase in the engine rotational speed Ne, the following fact is also taken as the condition for the continuous increase in the first clutch torque capacity: the time from start of the engagement of the first clutch 6 is within a prescribed time. Consequently, even when dispersion takes place in the first clutch torque transfer capacity tTc1 when the cranking priority is adopted, it is still possible to prevent the decrease in the slip quantity of the second clutch 7, and preventing the shock caused by the engagement of the second clutch 7 is possible.

In addition, according to the present embodiment, when it is impossible to increase the first clutch torque transfer capacity tTc1 of the first clutch 6 so that the prescribed engine rotational speed increase can be realized, the torque for increasing the engine rotational speed or the rotational speed time sequence variation is adopted by switching. Consequently, when the engine rotational speed Ne is increased with the prescribed time sequence variation and the motor torque becomes insufficient due to the compressive reactive force, by adopting the torque for increasing the engine rotational speed or the rotational speed time sequence variation by switching, preventing the engagement shock of the second clutch 7 together with the increase in the first clutch torque transfer capacity tTc1 is possible.

In addition, according to the present embodiment, when the first clutch torque transfer capacity tTc1 is increased so that the engine rotational speed is increased within a prescribed time to the high-speed region where the influence of the compressive reactive force can be ignored, the time from the engine shutdown is short, so that there is a significant influence of the compressive reactive force, and the motor torque is insufficient. In this case, the torque for increasing the engine rotational speed or the rotational speed time sequence variation is adopted by switching. Consequently, when the engine rotational speed Ne is increased with a prescribed time sequence variation and the motor torque is insufficient due to the compressive reactive force, by adopting the torque for increasing the engine rotational speed or the rotational speed time sequence variation by switching, it is possible to prevent the engagement shock of the second clutch 7 together with the increase in the first clutch torque transfer capacity tTc1.

In addition, according to the present embodiment, in the high engine rotational speed region where the influence of the compressive reactive force can be ignored, the torque transfer capacity tTc1 of the first clutch 6 is determined corresponding to the accelerator position opening APO (the required load) and the vehicle speed VSP. Consequently, the distribution of the motor torque is changed corresponding to the driving operation of the driver, and it is possible to realize a smooth acceleration.

In addition, according to the present embodiment, when the engine is started by progress in the engagement of the first clutch 6, the motor rotational speed is determined corresponding to the increase in the first clutch torque transfer capacity tTc1. Consequently, in the cranking, it is possible to increase the motor torque in a feed forward way, to prevent a fall in the input rotational speed and to prevent the shock caused by the engagement of the second clutch 7.

The invention claimed is:

1. An engine start control system of a hybrid vehicle, the hybrid vehicle having an engine and an electrically driven motor as the power sources, a first clutch provided between the engine and the electrically driven motor for changing a transmission torque capacity between the engine and the electrically driven motor, and a second clutch provided between the electrically driven motor and at least one drive wheel for changing a transmission torque capacity between the electrically driven motor and the at least one drive wheel, the engine start control system comprising at least one controller programmed to:

select an electrically driven running mode by shutting down the engine, releasing the first clutch and engaging the second clutch;

select a hybrid running mode by engaging both the first clutch and the second clutch;

control the first clutch and the engine by increasing a torque capacity of the first clutch to increase an engine rotational speed to a high-speed region within a prescribed time period to ignore an increase in the engine rotational speed caused by an engine compressive reactive force upon determining progressive engagement of the first clutch during a running mode switch from the electrically driven running mode to the hybrid running mode, wherein the prescribed time period is a time period during which an engine experiences a normal compressive reactive force during engine shutdown, the prescribed time period being based on engine compressive reactive force, wherein the engine compressive reactive force is determined based on an engine shutdown time;

decrease the torque capacity of the first clutch upon determining the engine rotational speed having reached the high-speed region; and calculate a torque value of the first clutch for increasing the engine rotational speed or a time sequence variation of the engine rotational speed based on engine compressive reactive force, upon determining the engine rotational speed having reached the high-speed region within the prescribed time period.

2. The engine start control system according to claim 1, wherein the at least one controller is further programmed to issue a first clutch torque capacity command for increasing the torque capacity of the first clutch, use the increase of the torque capacity of the first clutch in a calculation of an engagement hydraulic pressure command for the first clutch, not use the increase of the torque capacity of the first clutch in determining increasing the engine rotational speed, not use the torque capacity of the first clutch in a determination of the time sequence variation in the engine rotational speed.

3. The engine start control system according to claim 2, wherein
the at least one controller is further programmed to determine the torque capacity of the first clutch based on accelerator position and vehicle speed upon determining the engine rotational speed is in the high-speed region.

4. The engine start control system according to claim 2, wherein
the at least one controller is further programmed to determine a rotational speed of the electrically driven motor based on the increase in the torque capacity of the first clutch upon determining progressive engagement of the first clutch.

5. The engine start control system of the hybrid vehicle according to claim 1, wherein
the at least one controller is further programmed to control the increase in the torque capacity of the first clutch based on a hydraulic pressure of the first clutch or stroke of the first clutch.

6. The engine start control system of the hybrid vehicle according to claim 5, wherein
the at least one controller is further programmed to not increase the torque capacity of the first clutch upon determining a slip rotational speed of the second clutch is lower than a prescribed level.

7. The engine start control system according to claim 6, wherein
the at least one controller is further programmed to determine the torque capacity of the first clutch based on accelerator position and vehicle speed upon determining the engine rotational speed is in the high-speed region.

8. The engine start control system according to claim 6, wherein
the at least one controller is further programmed to determine a rotational speed of the electrically driven motor based on the increase in the torque capacity of the first clutch upon determining progressive engagement of the first clutch.

9. The engine start control system of the hybrid vehicle according to claim 5, wherein
the at least one controller is further programmed to take as a condition to not increase the torque capacity of the first clutch based on the slip rotational speed of the second clutch upon determining a difference between a value of a motor torque and a motor torque upper limit value of a slip rotational speed of the second clutch is lower than a prescribed level.

10. The engine start control system of the hybrid vehicle according to claim 5, wherein
the at least one controller is further programmed to not increase the torque capacity of the first clutch upon determining a prescribed time has lapsed from the start of the engagement of the first clutch.

11. The engine start control system of the hybrid vehicle according to claim 5, wherein
the at least one controller is further programmed to change a torque for increasing the engine rotational speed or the time sequence variation of the engine rotation speed upon determining the engine rotational speed has not reached a prescribed level.

12. The engine start control system according to claim 5, wherein
the at least one controller is further programmed to determine the torque capacity of the first clutch based on accelerator position and vehicle speed upon determining the engine rotational speed is in the high-speed region.

13. The engine start control system according to claim 5, wherein
the at least one controller is further programmed to determine a rotational speed of the electrically driven motor based on the increase in the torque capacity of the first clutch upon determining progressive engagement of the first clutch.

14. The engine start control system according to claim 1, wherein
the at least one controller is further programmed to determine the torque capacity of the first clutch based on accelerator position and vehicle speed upon determining the engine rotational speed is within the high-speed region.

15. The engine start control system according to claim 1, wherein
the at least one controller is further programmed to determine a rotational speed of the electrically driven motor based on the increase in the torque capacity of the first clutch upon determining progressive engagement of the first clutch.

* * * * *